United States Patent Office 2,798,516
Patented July 9, 1957

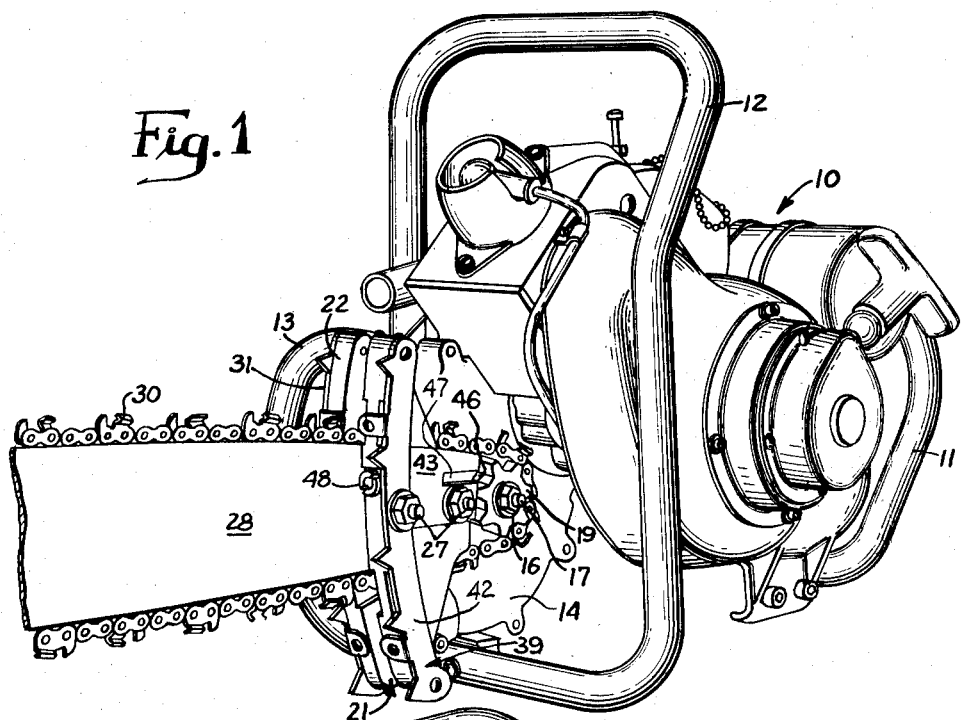
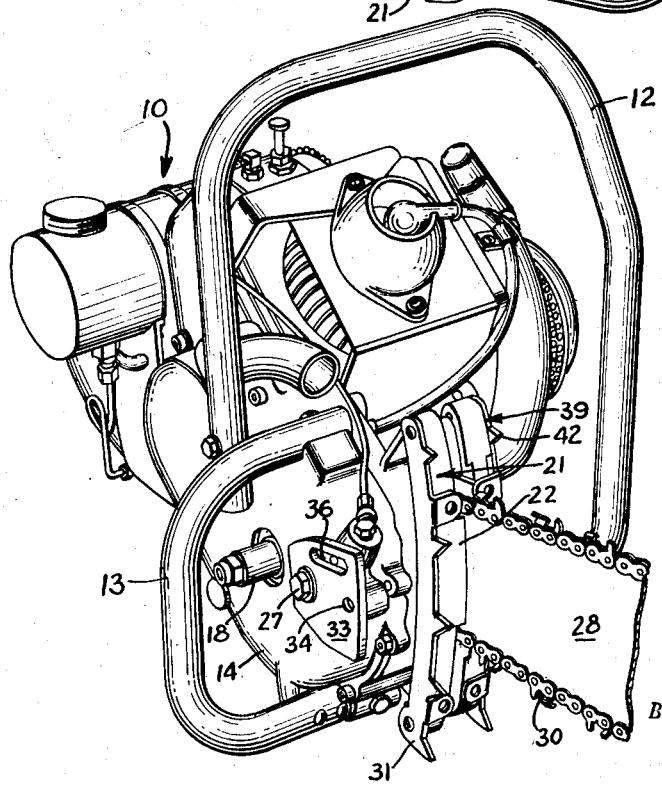

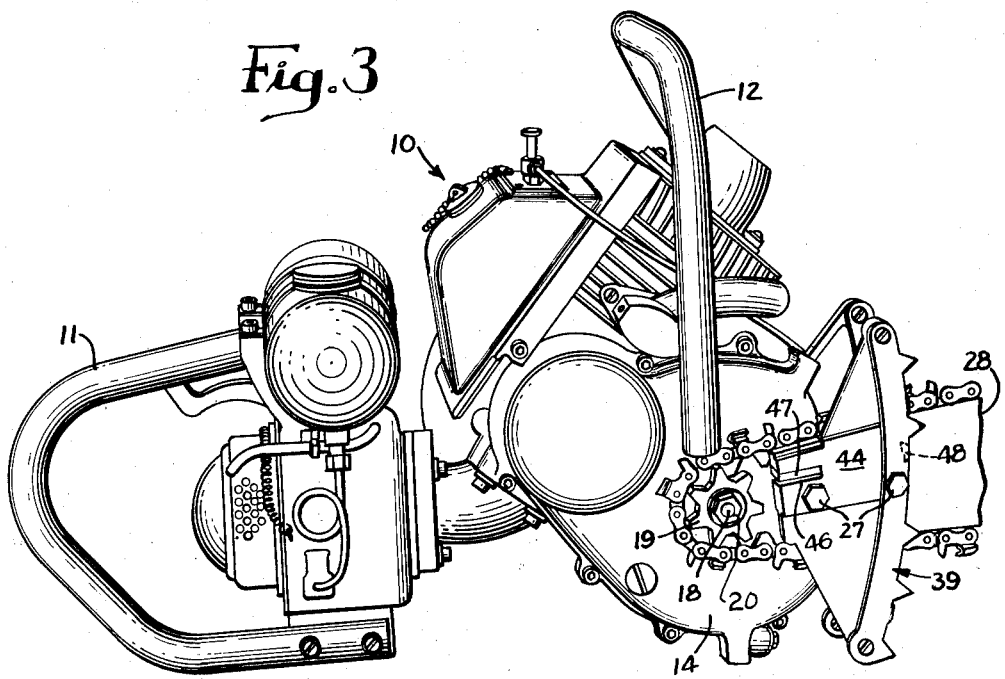

2,798,516

PORTABLE CHAIN SAW

Millard F. Heal, Chicago, and Glenn H. Angell, Western Springs, Ill., assignors to Sears, Roebuck and Co., Chicago, Ill., a corporation of New York Application December 10, 1953, Serial No. 397,328

3 Claims. (Cl. 143—32)

Our invention relates to portable motor driven chain saws of the type which are used primarily for felling trees and sawing up timber.

In prior devices of this character the saw chain which is guided around an elongated guide bar or plate of flat material in some machines is conventionally positioned substantially coincident with a medial plane through the power unit and in other machines is positioned at one side thereof. When using a saw of the first type for felling trees, the said saw does not permit cutting of standing timber in close proximity to the ground. Manifestly, the stumps left standing extend several inches above the ground resulting in a waste of timber and also in objectionable obstructions which provide hazards to a vehicle passing over the ground surface. When using a saw of the second type for cutting up felled timber, because of the unbalanced relation of the power unit to the guide bar, the saw chain tends to cut angularly instead of in a vertical plane. Resisting this tendency during operation places an added strain on the operator and results in increased fatigue of the operator and also in a waste of power developed by the power unit.

Accordingly, it is an object of our invention to provide a power driven chain saw in which the saw chain and guide bar may be mounted selectively in the above described medial position, as for sawing up timber, or may be readily mounted by the operator in a different position at one side of the power unit, as for felling trees, so that cutting may be effected in very close proximity to a ground surface.

Another object of our invention is the provision in a chain saw of the foregoing character of means which may be interchangeably positioned for locating the saw chain and guide bar in alternate positions without the use of additional parts or attachments.

Other objects and advantages of our invention will become apparent from the following description when considered in connection with the accompanying drawings in which:

Fig. 1 is a perspective view of a chain saw embodying our invention and showing the chain saw and cutter bar in one position of operation in relation to the power unit;

Fig. 2 is a perspective view of the invention illustrated in Fig. 1, looking in an oposite direction;

Fig. 3 is a perspective view showing the saw chain and guide bar in a different position of operation from that illustrated in Figs. 1 and 2, and Fig. 4 is a perspective view looking substantially in the same direction as in Fig. 1 and showing certain of the parts separated but in the same relation as illustrated in Fig. 3.

Referring to the drawings, our improved chain saw comprises a gasoline engine power unit and its appurtenances generally indicated by numeral 10 and provided with suitable tubular handles 11, 12 and 13 to permit manipulation of the apparatus. A casing 14 associated with the power unit 10 extends forwardly thereof and is located at one end of the power unit. The said casing houses suitable driving and driven gears, not shown, the driving gear being fixed on the drive shaft of the power unit which shaft projects into the housing and the driven gear being fixed on a sprocket shaft substantially medially thereof. The sprocket shaft is journaled in suitable anti-friction bearings supported in the casing and the end portions 17 and 18 of said shaft project outwardly from opposite sides of the casing, as illustrated clearly in Figs. 2 and 4. Each of the end portions 17 and 18 of the shaft is adapted to receive a sprocket 19 which is secured thereon as by a nut 20 or other suitable means.

Integrally formed with one side of the casing 14 and extending forwardly thereof is a bumper plate 21 having a forward arcuate edge 22 and a medial embossed portion 23 which is preferably provided with a machined surface, the said surface being disposed in a plane substantially medially of the power unit. The bumper plate 21 is provided with two alined apertures 26 to receive bolts 27 which pass therethrough, the said bolts being adapted to secure the chain saw guide bar 28 in a manner hereinafter to be described. The said embossed portion 23 is also provided with an elongated slot 29 for a purpose, as will be hereinafter described. Secured as with bolts to the bumper plate 21 is a spiked member 31 arranged so that the spikes thereof extend in a forwardly direction as illustrated. As is well understood in the art, the spiked member 31 serves as a means for retaining the saw chain 30 in cutting engagement with a log or tree.

Integral with the opposite side of the casing 14 and in transverse and parallel alinement with the embossed portion 23 is a plate portion 33 shaped substantially similarly to the embossed portion 23 and similarly having two alined apertures 34 and a slot 36 in registration with the apertures 26 and slot 29 respectively. The surface of the said plate portion 33 is preferably machined. As will be seen clearly in Fig. 2, the surface of the plate portion 33 is disposed in a plane which represents the outside dimensional limit of the gear casing or of the power unit.

A rigid guide bar 28 provided with a longitudinal edge groove for the reception and guidance of the opposite longitudinal runs of an endless chain cutter 30 is provided at its rearward end with a longitudinal slot, not shown, through which are adapted to pass securing bolts 27. The guide bar is of conventional construction and forms no part of the present invention. The guide bar is adapted to be secured in position by means of an auxiliary bumper plate 39 which in side elevation is shaped substantially similarly to the bumper plate 21. The auxiliary bumper plate is provided along its forward edge with flange portions 41 and is suitably drilled and tapped to receive bolts for securing a spiked member 42 in the position illustrated. The auxiliary bumper plate 39 is also provided on opposite sides thereof with identical embossings 43 and 44, as seen clearly in Fig. 3, the said embossings preferably having machined surfaces and also being drilled to receive securing bolts 27. The rearward end of the bumper plate 39 is slotted as at 46 to accommodate an L-shaped member 47 which passes through a communicating aperture in the said bumper plate and cooperates with a threaded adjusting nut 48 supported in the aperture at the forward edge of the bumper plate. When in assembled relation, as will be presently described, the transverse leg of member 47 is adapted to engage the rearward edge of the guide bar 28. Manipulation of the adjusting nut 48 effects adjustment of the saw chain tension. The slot 29 merely serves as clearance for accommodating the end of the transverse leg of member 47.

As will be clearly seen by reference to Figs. 1 and 2 the auxiliary bumper plate 39 serves as a means for clamping the guide bar against the main bumper plate 21 thereby securing the guide bar and saw chain in operative position. It will of course be understood that when it is desired to use the chain saw as for cutting logs, the guide bar 21 is preferably positioned as illustrated in Figs. 1 and 2 so that the guide bar and saw chain are disposed substantially medially of the engine unit. In this position it will be understood that the sprocket 19 is mounted on the end 17 of the shaft 16 alined with the main bumper plate 21.

When it is desired to use the chain saw, as for felling trees, so as to effect cutting of a tree as close to the ground as possible, the tubular handle 13 is first removed by removing the attaching screws or bolts. Thereafter upon removing the nuts from the retaining bolts 27 the auxiliary bumper plate 39 may be removed and the guide bar 28 and saw chain then repositioned so that the rearward end portion of the guide bar 28 is disposed contiguous to the plate portion 33 as illustrated in Fig. 3. The auxiliary bumper plate 39 is repositioned in the relationship illustrated in Figs. 3 and 4 and secured as with bolts 27 which have been removed and which are passed through the apertures in the bumper plate 39 and engage suitable threaded openings in the casing in registration therewith. Correspondingly, the sprocket 19 is removed from the shaft end 17 and secured on the opposite end 18 of the said shaft so that it is in driving alinement with the saw chain in its alternate position. It will of course be understood that in this latter position the transverse leg of the L-shaped member 47 is reversed so that it will engage the rearward edge of the guide bar 21 from the opposite side. The member 47, similarly as in the first instance, serves to adjust the tension of the saw chain on the guide bar.

It will be apparent that when the guide bar is in the last described position it is contemplated that the power unit and guide bar will be rotated 90° so that the saw chain will operate in a horizontal plane.

The particular arrangement providing for alternate positioning of the guide bar and saw chain without the use of additional parts or attachments gives the present apparatus certain advantages not found in prior art structures of this nature. The provision of an alternate operating position for the guide bar and saw chain in a plane substantially coincident with one of the ends of the power unit permits the guide bar and saw to be held very close to the ground when felling trees resulting in a minimum of tree stump remaining. When the chain saw is to be used as for bucking or cutting logs, the parts are preferably repositioned to the location illustrated in Figs. 1 and 2, and the handle member is replaced to provide the necessary gripping means for safe manipulation of the chain saw.

Various changes coming within the spirit of our invention may suggest themselves to those skilled in the art. Hence we do not wish to be limited to the specific embodiments described or uses mentioned, but intend the same to be merely exemplary, the scope of our invention being limited only by the appended claims.

We claim:

1. A chain saw apparatus comprising in combination a power unit, a support member associated with said power unit and extending forwardly thereof, a sprocket shaft journaled in said support member and operatively connected substantially medially thereof with the driving means of said power unit, said shaft having similar sprocket mountings at each end thereof, a sprocket selectively mounted on either of said shaft ends, said support member having opposed parallel surfaces disposed in spaced planar relationship at right angles to the axis of said shaft, a guide bar and saw chain, and means for selectively clamping said guide bar to one of said parallel surfaces so that said saw chain may be operated in alternate parallel positions.

2. A chain saw apparatus comprising in combination a power unit, a gear casing associated with said power unit and extending forwardly thereof, a sprocket shaft transversely journaled in said casing and having similar sprocket mountings on each end thereof, a sprocket selectively mounted on either of said shaft ends, a gear fixed on said shaft substantially intermediate the ends thereof and being in operative engagement with the driving means of said power unit, a main bumper plate integral with said casing and extending forwardly thereof, said plate having a mounting surface disposed in a plane substantially medially of said power unit, said casing having a second mounting surface parallel to and in transverse alinement with the first mentioned mounting surface, said second mounting surface being disposed in a plane substantially at one end of said power unit, a guide bar and saw chain, and an auxiliary bumper plate cooperating with either of said mounting surfaces to selectively secure said guide bar and chain in one of two positions of operation.

3. A chain saw apparatus comprising in combination a power unit, a support member associated with said power unit, a guide bar and saw chain, said support member having alternate mounting means in spacced parallel planar relationship for selectively mounting said guide bar and saw chain in alternate parallel planes of operation, coaxially mounted alternate saw chain driving means adapted to be spaced axially and operatively connected with the driving means of said power unit, and means for selectively operatively connecting said saw chain with said alternate driving means so that said chain may be operated in either of alternate parallel positions.

References Cited in the file of this patent

UNITED STATES PATENTS

| 1,528,535 | De Walt | Mar. 3, 1925 |
| 2,165,524 | Wolf | July 11, 1939 |
| 2,370,556 | Mall | Feb. 27, 1945 |
| 2,567,886 | Mall et al. | Sept. 11, 1951 |
| 2,610,657 | Kiekhaefer | Sept. 16, 1952 |
| 2,645,254 | Van Ausdell | July 14, 1953 |

FOREIGN PATENTS

| 103,356 | Austria | May 25, 1926 |